US012699789B2

(12) United States Patent
Alberti et al.

(10) Patent No.: US 12,699,789 B2
(45) Date of Patent: Aug. 4, 2026

(54) DIRECT ACCESS OF DATA LAKE FILES

(71) Applicant: SAP SE, Walldorf (DE)

(72) Inventors: Johannes Alberti, Walnut Creek, CA (US); Dylan Vollrath, Atlanta, GA (US); Felipe Einsfeld Kersting, Rio Grande do Sul (BR); Rubens Luiz Rech, Jr., Rio Grande do Sul (BR)

(73) Assignee: SAP SE, Walldorf (DE)

( * ) Notice: Subject to any disclaimer, the term of this patent is extended or adjusted under 35 U.S.C. 154(b) by 22 days.

(21) Appl. No.: 18/945,001

(22) Filed: Nov. 12, 2024

(65) Prior Publication Data

US 2026/0099615 A1 Apr. 9, 2026

Related U.S. Application Data

(60) Provisional application No. 63/703,570, filed on Oct. 4, 2024.

(51) Int. Cl.
| | |
|---|---|
| *G06F 21/62* | (2013.01) |
| *G06F 21/31* | (2013.01) |
| *G06F 21/60* | (2013.01) |

(52) U.S. Cl.
CPC .......... *G06F 21/6209* (2013.01); *G06F 21/31* (2013.01); *G06F 21/604* (2013.01)

(58) Field of Classification Search
CPC .... G06F 21/6209; G06F 21/31; G06F 21/604; G06F 21/6272; H04L 63/08; H04L 63/101
See application file for complete search history.

(56) References Cited

U.S. PATENT DOCUMENTS

| | | | | |
|---|---|---|---|---|
| 8,544,070 | B2 * | 9/2013 | Mukkara | H04L 63/126 380/247 |
| 10,248,808 | B2 * | 4/2019 | Kato | H04L 63/045 |
| 10,581,798 | B2 * | 3/2020 | Meuninck | H04L 61/4511 |
| 11,416,633 | B2 * | 8/2022 | Schmatz | G06F 21/6245 |
| 11,507,571 | B2 * | 11/2022 | Muralidhar | G06F 16/248 |
| 11,809,584 | B2 * | 11/2023 | Tamura | H04L 9/14 |
| 11,929,986 | B1 * | 3/2024 | Igram | G06F 21/6218 |
| 12,132,835 | B2 * | 10/2024 | Stuntebeck | G06F 16/13 |
| 12,184,610 | B2 * | 12/2024 | Iqram | G06F 21/6218 |
| 12,235,835 | B2 * | 2/2025 | Muralidhar | G06F 3/0644 |
| 12,450,380 | B2 * | 10/2025 | Tamura | G06F 21/78 |
| 2019/0286832 | A1 | 9/2019 | Szeto et al. | |
| 2021/0406282 | A1 | 12/2021 | Yarlagadda | |
| 2024/0333716 | A1 | 10/2024 | Piagentini et al. | |

OTHER PUBLICATIONS

"European Application Serial No. 25206416.7, Extended European Search Report mailed Feb. 2, 2026", 5 pgs.

* cited by examiner

*Primary Examiner* — Hosuk Song
(74) *Attorney, Agent, or Firm* — SCHWEGMAN LUNDBERG & WOESSNER, P.A.

(57) ABSTRACT

In an example embodiment, a solution is provided that allows users to interact directly with underlying object data lake storages in hyperscalers when accessing user data. This feature is known as direct access. Use of this solution increases performance of the user systems and the cloud systems, without impacting the functionality nor increasing the complexity. This is true even for Spark users, where the driver abstracts the communication path between the Spark application and HDL files. This results in an opt-in solution that allows users to reduce their cost by increasing complexity.

20 Claims, 4 Drawing Sheets

200

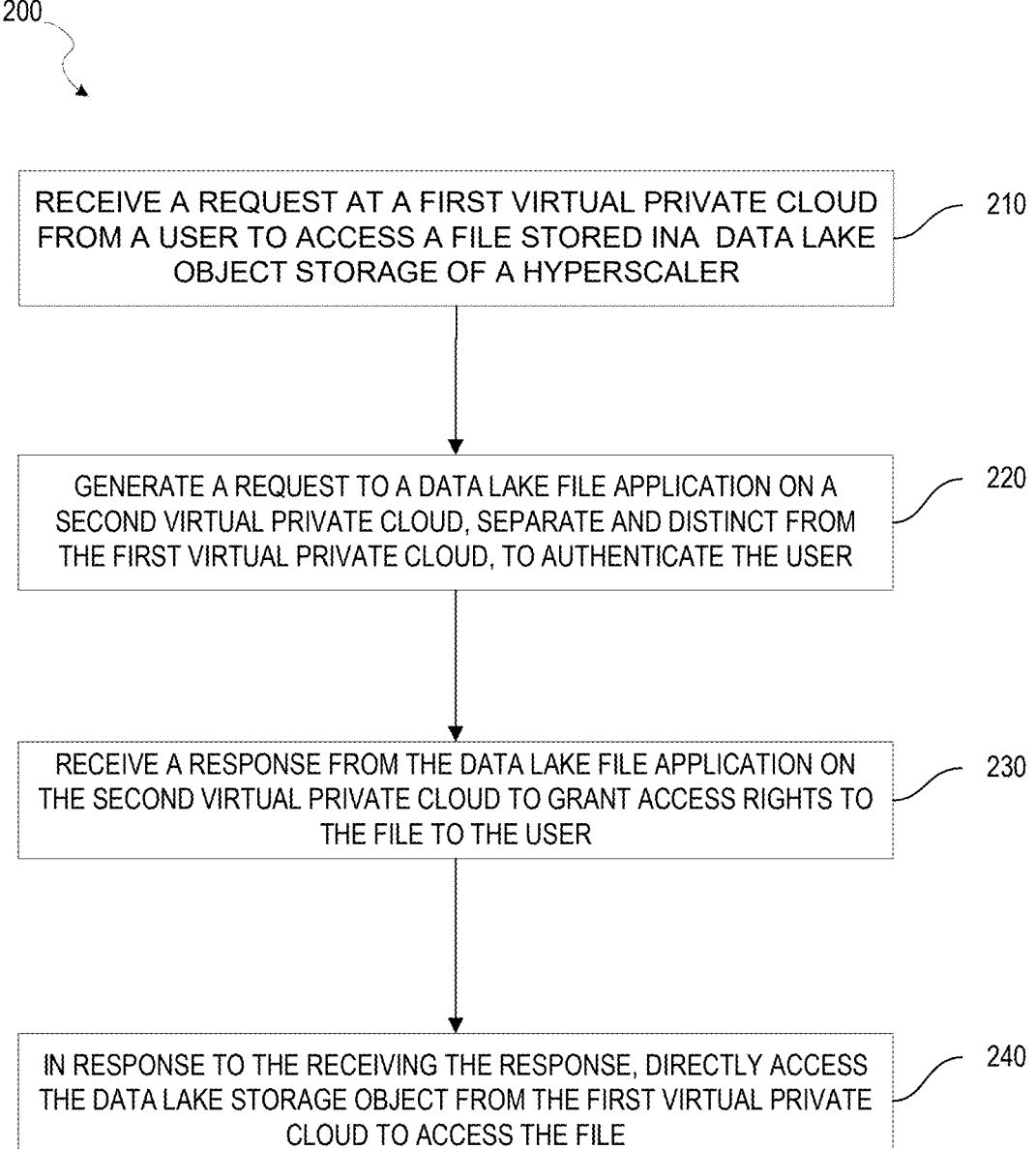

RECEIVE A REQUEST AT A FIRST VIRTUAL PRIVATE CLOUD FROM A USER TO ACCESS A FILE STORED INA  DATA LAKE OBJECT STORAGE OF A HYPERSCALER    210

GENERATE A REQUEST TO A DATA LAKE FILE APPLICATION ON A SECOND VIRTUAL PRIVATE CLOUD, SEPARATE AND DISTINCT FROM THE FIRST VIRTUAL PRIVATE CLOUD, TO AUTHENTICATE THE USER    220

RECEIVE A RESPONSE FROM THE DATA LAKE FILE APPLICATION ON THE SECOND VIRTUAL PRIVATE CLOUD TO GRANT ACCESS RIGHTS TO THE FILE TO THE USER    230

IN RESPONSE TO THE RECEIVING THE RESPONSE, DIRECTLY ACCESS THE DATA LAKE STORAGE OBJECT FROM THE FIRST VIRTUAL PRIVATE CLOUD TO ACCESS THE FILE    240

*FIG. 2*

DIRECT ACCESS OF DATA LAKE FILES

CROSS-REFERENCE TO RELATED APPLICATIONS

This application claims the benefit of U.S. Provisional Application No. 63/703,570, filed Oct. 4, 2024, entitled "DIRECT ACCESS OF DATA LAKE FILES," which is incorporated herein by reference in its entirety.

BACKGROUND

A data lake is a single, centralized repository where an organization can store data in structured, unstructured, and semi-structured format. This allows an organization to more quickly and easily store, access, and analyze a wide variety of data in a single location. Unlike a database, data stored in a data lake does not need to fit into a specific structural format. Instead, data can be stored in its raw or native format, usually as files or binary large objects (BLOBS).

BRIEF DESCRIPTION OF DRAWINGS

The present disclosure is illustrated by way of example and not limitation in the figures of the accompanying drawings, in which like references indicate similar elements.

FIG. 2 is a flow diagram illustrating a method for granting access to a file on a data lake, in accordance with an example embodiment.

DETAILED DESCRIPTION

Figure 1:
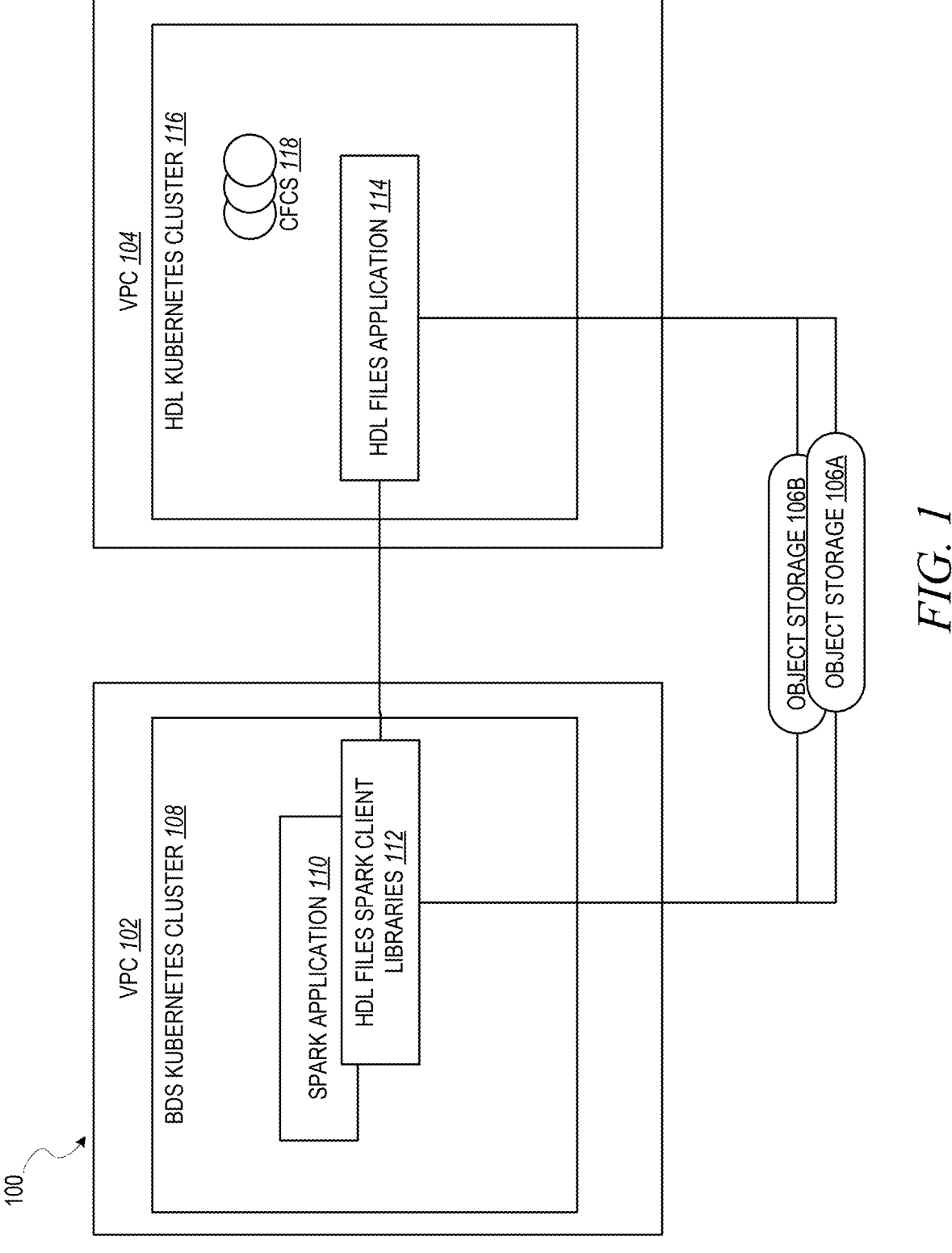
FIG. 1 is a block diagram illustrating a system for HDL file management, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Files in a data lake may be stored in a data lake storage format. Data lake files can also sometime be stored in an in-memory data store, such as HANA™ from SAP of Walldorf, Germany. A capability to store files in HANA in a data lake storage format is known as HANA Data Lake (HDL) Files.

HDL Files may be shared among multiple hyperscalers. A hyperscaler is a company or entity that operates at an extremely large scale, typically in the context of cloud computing and data center infrastructure. These organizations manage vast amounts of data and computing resources, often across multiple geographic regions, and have the capacity to scale their operations quickly to meet growing demand. Thus, in a system with multiple hyperscalers (e.g., Amazon Web Services, Azure, etc.), the files in each hyperscaler's data lake may be stored using HDL Files. Thus, HDL Files leverages the object storages provided by the underlying hyperscaler to store all user data.

When accessing the storage, users interact with an HDL Files application and have no means of directly interacting with the underlying object storages. Users are not aware of where the data is stored behind the scenes. The HDL Files application is responsible for providing the storage, and all the access to the storage is performed through Application Program Interfaces (APIs) exposed by HDL Files.

This presents a technical problem. Since all communication between a user and a storage must go through HDL Files, the overall communication cost could potentially be higher and the performance worse than if communications were direct.

Creating abstraction layers comes with costs, so one needs to strike a balance between the level of abstraction and the perception of value In an example embodiment, a solution is provided that allows users to interact directly with underlying object data lake storages in hyperscalers when accessing user data. This feature is known as direct access. Use of this solution increases performance of the user systems and the cloud systems, without impacting the functionality nor increasing the complexity. This is true even for Spark users, where the driver abstracts the communication path between the Spark application and HDL Files. This results in an opt-in solution that allows users to reduce their cost by increasing complexity.

Apache Spark is an open-source, distributed computing system designed for processing large-scale data sets quickly and efficiently. It provides a unified analytics engine with built-in modules for various data processing tasks, such as:

1. Batch Processing: Spark can handle large-scale data processing tasks, often used for running big data jobs that require processing huge amounts of data in batches.
2. Stream Processing: It supports real-time data processing and analytics, allowing you to process streaming data as it arrives.
3. SQL Queries: With Spark SQL, you can run SQL queries against data, integrating with existing data sources and enabling a variety of analytics operations.
4. Machine Learning: Spark includes MLlib, a library of machine learning algorithms that facilitates scalable machine learning and data mining.
5. Graph Processing: GraphX is Spark's API for graph processing, enabling the analysis and manipulation of graph-structured data.

Spark is designed to be fast and scalable, leveraging in-memory computing to speed up data processing tasks. It can handle a wide range of workloads and is often used in conjunction with Hadoop's HDFS (Hadoop Distributed File System) but can also work with other data storage systems. Its ease of use and versatile capabilities make it a popular choice for big data applications and analytics.

FIG. 1 is a block diagram illustrating a system 100 for HDL file management, in accordance with an example embodiment. The system 100 includes a first virtual private cloud (VPC) 102 and a second VPC 104. Also present in the system are a plurality of object storages 106A, 106B, each operated by a different hyperscaler.

HDL Files is an existing HANA cloud service/component that is extended using the present solution. The responsibility of the HDL Files component in the HANA Cloud is to provide object storage using a hyperscaler platform-agnostic Representational State Transfer (REST) API. Previously HDL Files leveraged the object storages 106A, 106B provided by the underlying hyperscalers to store all user data. In an example embodiment, HDL files now support an alternative operation mode called, "direct access." It will only govern user's access to the storage, but user data will be downloaded/uploaded directly from/to the hyperscaler. This design allows for the achievement of increased performance (latency, throughput, bandwidth, for example) and lowered costs. It is due to the reduction in computing costs on the HDL Files side; the reduction of costs caused by avoiding the transfer of data across VPC boundaries.

Note that, in this operation mode, user authentication and authorization are still provided and enforced by HDL Files.

The first VPC 102 contains a Big Data Services (BDS) Kubernetes Cluster 108. Kubernetes is a system for automating deployment, scaling, and management of containerized applications. Application containerization is a virtualization method used by operating systems to deploy and run distributed applications without launching an entire virtual machine for each application.

Inside the BDS Kubernetes Cluster 108, a spark application 110 runs user workloads that leverage HDL files as its storage. This is performed by means of HDL Files Spark Client Libraries 112, which implements Spark interfaces to speak with HDL file services.

HDL Files Spark client libraries are libraries that allow the integration between Spark and HDL Files. These libraries transfer data to HDL Files using the endpoints exposed by HDL Files and require no knowledge about the underlying object stores. This causes data to be transferred across VPCs, which can potentially incur additional costs. Furthermore, computing resources will be required by HDL Files to process the data being transferred, incurring even more costs. In an example embodiment, the HDL Files Spark Client Libraries 112 now leverage the present solution, specifically direct access, to transfer the data directly to the object store, in order to achieve increased performance and reduced cost.

The HDL Files application 114 runs within an HDL Kubernetes Cluster 116 on the second VPC 104.

The hyperscaler-specific object storages 106A, 106B each ultimately hold data contents of users. Each hyperscaler provides APIs to interact with the object storage, which can ordinarily be leveraged and completely abstracted by HDL Files. When direct access is used, however, the user interacts directly with the hyperscaler using these APIs, which are not unified across hyperscalers. In this context, the HDL Files application 114 is still responsible to govern the transfer, and, therefore, will rely on the underlying hyperscaler capabilities to do so. This includes generating pre-signed URLs, temporary credentials or any other resources that are proven necessary, which will be analyzed and defined on a per-hyperscaler basis.

It should be noted that the HDL Files Application 114 presents, to the user, credentials/resources that have minimal permissions to access the target file, thus the hyperscaler should have such capabilities as a pre-requisite.

HDL Files' existing APIs are unchanged, but a new optional HTTP header will be added to OPEN and CREATE operations to allow users to request the data to be transferred directly from/to the underlying object storage. The user will be able to request direct access as a hint, falling back to the default operation modes if direct access is not available, as well as request direct access as a requirement, in this case failing the request if not fulfilled.

When direct access is requested, no object content data transfer will occur through the HDL Files application 114.

Instead, the HDL Files application 114 will only govern the transfer by returning a JSON response to the client containing the necessary information for the client to establish a connection with the hyperscaler and directly transfer the data.

The response from the HDL Files will contain hyperscaler-specific data and it is expected that the client will be able to interpret the response and behave differently depending on the received hyperscaler type. The returned data might contain a pre-signed URL, temporary credentials, or any other data that proved necessary to be present to allow the user to perform the operation.

For example, considering an OPEN call/test?op=OPEN, the user could request direct access by setting the header X-SAP-Accept-Direct-Access to "true." This header is interpreted as a hint by HDL Files and, if direct access is not enabled or supported, the header would be simply ignored. If direct access is required by the user, header "X-SAP-Expect-Direct-Access: true" would be used, in which case HDL Files would respond with a failure message if direct access could not be fulfilled.

HDL Files will return the response header "X-SAP-Direct-Access: true" to the client indicating that direct access is being used to allow the client to interpret the response body correctly.

Considering the underlying object store is "GCS" and direct access is fulfilled, an HDL File's response body would look like:

```
{
    "type": "GCS",
    "properties": {
    "headers": {
        "x-goog-custom-audit-hdlf-request-id":"r-
    BcrczRKLxlsG4InfQQJhYsiIk"
        },
        "endpoint":
    "https://storage.googleapis.com/bucket/test?GoogleAccessId=<iam-uuid
        "method": "GET"
        }
}
```

Note that the response indicates the underlying storage type as well as hyperscaler-specific properties, such that the client can parse it and handle it properly. One such property is the presence of header entries; whatever entries are provided by the response must be used as headers in a request against the provided endpoint. In this example, HDL files generate a pre-signed Uniform Resource Locator (URL) that allows the reading of the file directly from the hyperscaler via HTTPS. Note that hyperscaler-specific information is also present in the URL itself, such as the bucket name and IAM user. This information will refer to resources that were provisioned solely for the Cluster File Container (CFC) 118 to be accessed. Also, note that the URL is pre-signed with a key that is managed by HDL Files, so it is impossible for the user to alter the path being accessed or the expiration time.

Furthermore, HDL Files' OPEN call allows the user to specify the read range via offset and length query parameters. These parameters will also be supported when direct access is used, however, they will most likely not be directly enforced by the returned pre-signed URL, given that most hyperscalers do not support that. Instead, the offset and range will be injected by the user on the request to the hyperscaler. Note that this is not an issue given that HDL Files do not support unauthorizing a user to read specific parts of a file.

The CREATE operation will work similarly to the OPEN operation. However, it is important that HDL Files allows the user to fully leverage the hyperscaler upload capabilities, such as multipart-upload or resumable-upload, when and where available. For that, more information than a simple pre-signed URL might need to be returned to the user, such as temporary credentials.

Finally, it is delegated to the client/user the job of performing the request to the specified hyperscaler with the information returned from HDL Files. Clients will be provided with proper documentation stating the format of HDL Files response, as well as how to interpret the data and call the APIs properly. In the Apache Spark scenario, the job of consuming these APIs and interacting with the hyperscalers is delegated to our Spark libraries.

As for security, even though the data transfer will not go through HDL Files, HDL Files will still govern the transfer and enforce user authentication and authorization. Users will only be able to request direct access if they have permission to do so, based on the trusted authorities configured in the Cluster File Container being accessed, as well as the roles and access policies assigned to the user. Once the user performs the request and obtains a JSON response from HDL Files, the user is considered authorized, and anyone in possession of the JSON response will be able to interact with the hyperscaler.

The user will not have permission to operate on any other files outside of the target prefix. Files that are within the target prefix might also be available for reading/writing. In this context, special care must be taken from HDL Files to never allow direct access on a prefix that might violate user-defined access policies.

HDL Files will ultimately leverage the security concepts offered by the underlying hyperscaler to enforce a communication with minimal permissions between user and hyperscaler. Hyperscalers can allow the creation of pre-signed URLs that target a specific file, as well as the generation of temporary credentials with limited access, leveraging IAM users with permissions to access specific paths within a bucket. The exact approach to be used will depend on the hyperscaler.

Furthermore, the response returned by HDL Files will always grant temporary permissions to the user, and the permissions should always expire after a short period. This will also be enforced by leveraging hyperscaler available capabilities, such as temporary pre-signed URLs and temporary credentials. If a user becomes unauthorized to a given file in HDL Files after they own direct access temporary permissions, the temporary permissions might remain valid until their expiration time, which is a reasonable compromise given the system's eventual consistency nature.

In order to minimize the risk of unauthorized personnel accessing a given CFC (if they get hold of temporary permissions), some restrictions can be enforced. Object storages will be configured with policies that will allow access only from private IP addresses, which will enforce that the access is being performed by a user from within the same hyperscaler network and region. By enforcing that the object storage itself is only accessible from a certain IP range, resources such as pre-signed URLs and temporary credentials will be automatically restricted as well. This concept can be extended, if necessary, to allow the user to specify a specific IP range to be allowed.

As to user handling, new options will be added to the CREATE and OPEN operations to allow users to request direct access. When direct access is provided, HDL Files will return a well-documented response in JSON format, which must be parsed and interpreted by the clients. Clients that want to leverage direct access will be required to implement dedicated logic to interact with each hyperscaler of interest.

Thus, a mechanism is created in a control plane to allow an application to get authorized and express desire for certain resources, and the control plane generates a URL to allow applications to go directly to endpoint. This works across multiple hyperscalers, as the correct URL can be acquired in a hyperscale agnostic way.

In some example embodiments, a JSON Web Token (JWT) can be included as a URL parameter to provide additional authentication capabilities. Additionally, in some instances traceability of use of URL is important; such as when a URL is used and how often can be tracked.

If there are multiple locations of a hyperscaler, the URL can be directed to the location that is closest to the user.

Furthermore, the header of the request can also influence which URL is generated. For example, the request parameters could include a read range or specific columns. Access to individual columns could even be independently authorized.

FIG. 2 is a flow diagram illustrating a method 200 for granting access to a file on a data lake, in accordance with an example embodiment. At operation 210, a request is received, at a first virtual private cloud, from a user, to access a file stored in a data lake object storage of a hyperscaler separate and distinct from the first virtual private cloud.

At operation 220, a request to a data lake file application on a second virtual private cloud, separate and distinct from the first virtual private cloud, to authenticate the user, is generated.

At operation 230, a response is received from the data lake file application on the second virtual private cloud to grant access rights to the file to the user.

At operation 240, in response to the receiving the response, the data lake storage object is directed accessed from the first virtual private cloud to access the file.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1 is a system comprising: at least one hardware processor; and a computer-readable medium storing instructions that, when executed by the at least one hardware processor, cause the at least one hardware processor to perform operations comprising: receiving, at a first virtual private cloud, from a user, a request to access a file stored in a data lake object storage of a hyperscaler, separate and distinct from the first virtual private cloud; generating a request to a data lake file application on a second virtual private cloud, separate and distinct from the first virtual private cloud, to authenticate the user; receiving a response from the data lake file application on the second virtual private cloud to grant access rights to the file to the user; and in response to receiving the response, directly accessing the data lake storage object from the first virtual private cloud to access the file.

In Example 2, the subject matter of Example 1 comprises, wherein directly accessing the data lake storage object uses an Application Program Interface provided in a data lake file's client library on the first virtual private cloud.

In Example 3, the subject matter of Example 2 comprises, wherein the data lake file application determines that the user should be granted access rights to the file based on trusted authorities listed in a cluster file container on the second virtual private cloud.

In Example 4, the subject matter of Examples 1-3 comprises, wherein the request to access the file contains a specialized header where the user requests direct access.

In Example 5, the subject matter of Examples 1-4 comprises, wherein the response comprises hyperscaler-specific data.

In Example 6, the subject matter of Example 5 comprises, wherein the hyperscaler-specific data comprises a pre-signed uniform resource locator (URL).

In Example 7, the subject matter of Examples 5-6 comprises, wherein the hyperscaler-specific data comprises temporary credentials.

Example 8 is a method comprising: receiving, at a first virtual private cloud, from a user, a request to access a file stored in a data lake object storage of a hyperscaler separate and distinct from the first virtual private cloud; generating a request to a data lake file application on a second virtual private cloud, separate and distinct from the first virtual private cloud, to authenticate the user; receiving a response from the data lake file application on the second virtual private cloud to grant access rights to the file to the user; and in response to receiving the response, directly accessing the data lake storage object from the first virtual private cloud to access the file.

In Example 9, the subject matter of Example 8 comprises, wherein the directly accessing the data lake storage object uses an Application Program Interface provided in a data lake file's client library on the first virtual private cloud.

In Example 10, the subject matter of Example 9 comprises, wherein the data lake file application determines that the user should be granted access rights to the file based on trusted authorities listed in a cluster file container on the second virtual private cloud.

In Example 11, the subject matter of Examples 8-10 comprises, wherein the request to access the file contains a specialized header where the user requests direct access.

In Example 12, the subject matter of Examples 8-11 comprises, wherein the response comprises hyperscaler-specific data.

In Example 13, the subject matter of Example 12 comprises, wherein the hyperscaler-specific data comprises a pre-signed uniform resource locator (URL).

In Example 14, the subject matter of Examples 12-13 comprises, wherein the hyperscaler-specific data comprises temporary credentials.

Example 15 is a non-transitory machine-readable medium storing instructions which, when executed by one or more processors, cause the one or more processors to perform operations comprising: receiving, at a first virtual private cloud, from a user, a request to access a file stored in a data lake object storage of a hyperscaler separate and distinct from the first virtual private cloud; generating a request to a data lake file application on a second virtual private cloud, separate and distinct from the first virtual private cloud, to authenticate the user; receiving a response from the data lake file application on the second virtual private cloud to grant access rights to the file to the user; and in response to receiving the response, directly accessing the data lake storage object from the first virtual private cloud to access the file.

In Example 16, the subject matter of Example 15 comprises, wherein the directly accessing uses an Application Program Interface provided in a data lake file's client library on the first virtual private cloud.

In Example 17, the subject matter of Example 16 comprises, wherein the data lake file application determines that the user should be granted access rights to the file based on trusted authorities listed in a cluster file container on the second virtual private cloud.

In Example 18, the subject matter of Example 17 comprises, wherein the request to access the file contains a specialized header where the user requests direct access.

In Example 19, the subject matter of Examples 15-18 comprises, wherein the response comprises hyperscaler-specific data.

In Example 20, the subject matter of Example 19 comprises, wherein the hyperscaler-specific data comprises a pre-signed uniform resource locator (URL).

Example 21 is at least one machine-readable medium comprising instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 3:
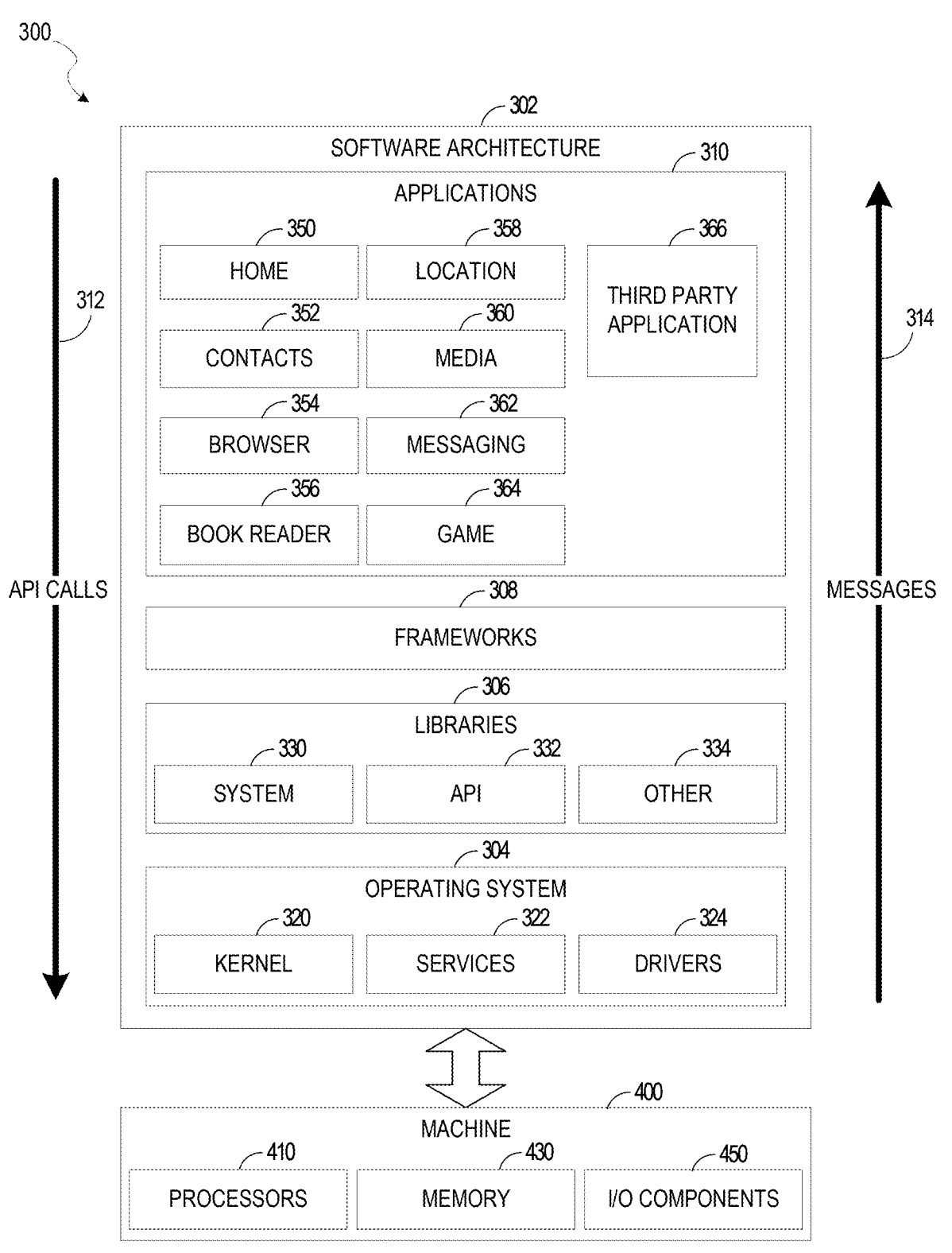
FIG. 3 is a block diagram illustrating a software architecture which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 of FIG. 3 can be conceptualized as a stack of layers where each layer may provide a particular functionality. For example, the software architecture 302 includes layers such as an operating system 304, libraries 306, frameworks 308, and applications 310. Operationally, the applications 310 invoke Application Program Interface (API) calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware. For instance, the drivers 324 can include display drivers, camera drivers, BLUETOOTH® or BLU-ETOOTH® Low-Energy drivers, flash memory drivers, serial communication drivers (e.g., Universal Serial Bus [USB] drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries

306 can include API libraries 332 such as media libraries (e.g., libraries to support presentation and manipulation of various media formats such as Moving Picture Experts Group-4 [MPEG4], Advanced Video Coding [H.264 or AVC], Moving Picture Experts Group Layer-3 [MP3], Advanced Audio Coding [AAC], Adaptive Multi-Rate [AMR] audio codec, Joint Photographic Experts Group [JPEG or JPG], or Portable Network Graphics [PNG]), graphics libraries (e.g., an OpenGL framework used to render in two-dimensional [2D] and three-dimensional [3D] in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310. For example, the frameworks 308 provide various graphical user interface (GUI) functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. The applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit [SDK] by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
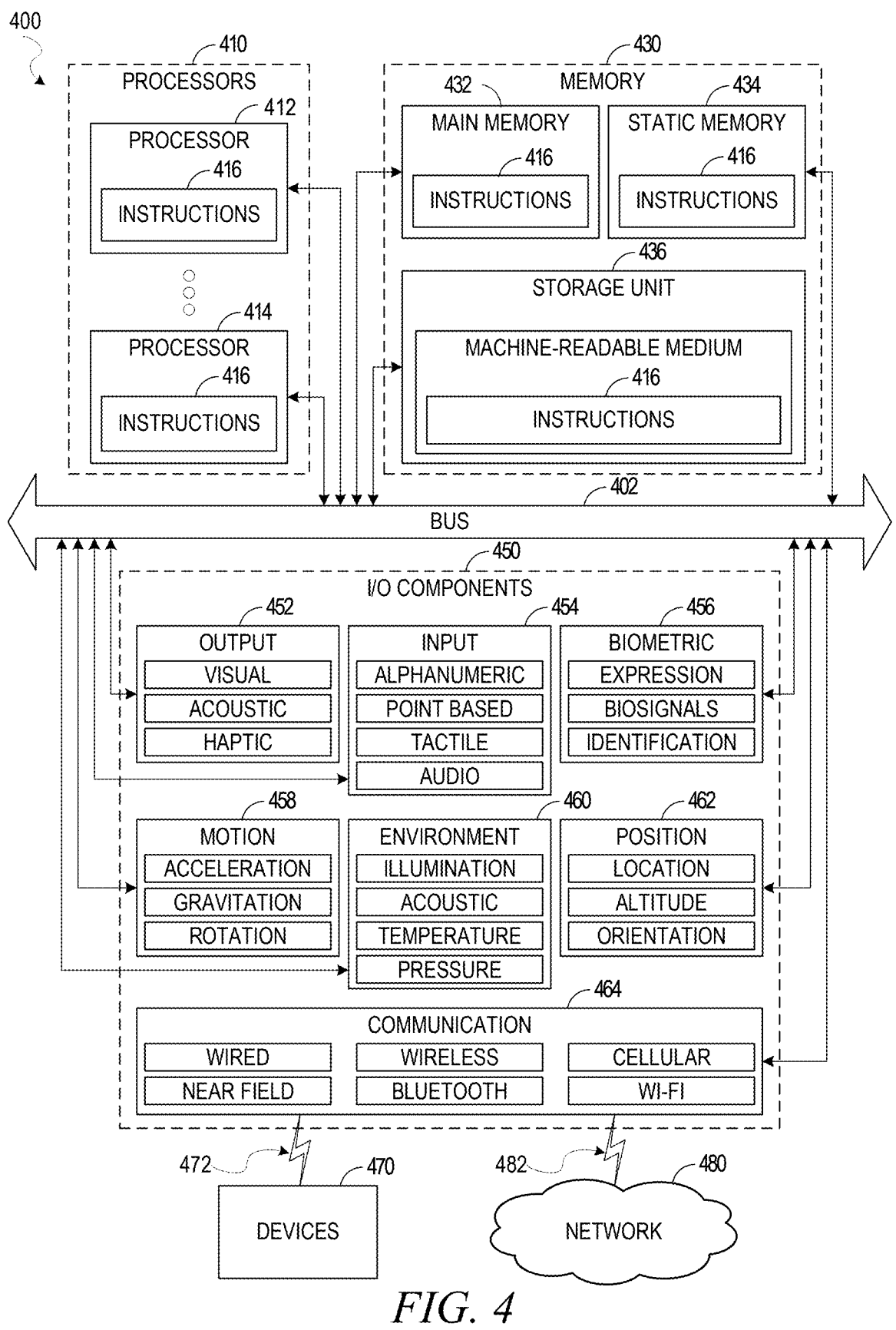
FIG. 4 illustrates a diagrammatic representation of a machine in the form of a computer system within which a set of instructions may be executed for causing the machine to perform any one or more of the methodologies discussed herein.

FIG. 4 illustrates a diagrammatic representation of a machine 400 in the form of a computer system within which a set of instructions may be executed for causing the machine 400 to perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit [CPU], a reduced instruction set computing [RISC] processor, a complex instruction set computing [CISC] processor, a graphics processing unit [GPU], a digital signal processor [DSP], an application-specific integrated circuit [ASIC], a radio-frequency integrated circuit [RFIC], another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel [PDP], a light-emitting diode [LED] display, a liquid crystal display [LCD], a projector, or a cathode ray tube [CRT]), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System [GPS] receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (i.e., 430, 432, 434, and/or memory of the processor [s] 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO)

technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of several well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor;
   a computer-readable medium storing instructions that, when executed by the at least one hardware processor, cause the at least one hardware processor to perform operations comprising:
   receiving, at a first virtual private cloud, from a user, a request to access a file stored in a data lake object storage of a hyperscaler;
   generating a request, to authenticate the user, to a data lake file application on a second virtual private cloud, separate and distinct from the first virtual private cloud, the data lake object storage being separate and distinct from both the first virtual private cloud and the second virtual private cloud;
   receiving a response from the data lake file application on the second virtual private cloud, the response indicating that access rights to the file have been granted to the user; and
   in response to the receiving the response, directly accessing the data lake storage object from the first virtual private cloud to access the file.

2. The system of claim 1, wherein the directly accessing uses an Application Program Interface provided in a data lake files client library on the first virtual private cloud.

3. The system of claim 2, wherein the data lake file application determines that the user should be granted access rights to the file based on trusted authorities listed in a cluster file container on the second virtual private cloud.

4. The system of claim 1, wherein the request to access the file contains a specialized header where the user requests direct access.

5. The system of claim 1, wherein the response comprises hyperscaler-specific data.

6. The system of claim 5, wherein the hyperscaler-specific data comprises a pre-signed uniform resource locator (URL).

7. The system of claim 5, wherein the hyperscaler-specific data comprises temporary credentials.

8. A method comprising:
   receiving, at a first virtual private cloud, from a user, a request to access a file stored in a data lake object storage of a hyperscaler;
   generating a request, to authenticate the user, to a data lake file application on a second virtual private cloud, separate and distinct from the first virtual private cloud, the data lake object storage being separate and distinct from both the first virtual private cloud and the second virtual private cloud;
   receiving a response from the data lake file application on the second virtual private cloud, the response indicating that access rights to the file have been granted to the user; and
   in response to the receiving the response, directly accessing the data lake storage object from the first virtual private cloud to access the file.

9. The method of claim 8, wherein the directly accessing the data lake storage object uses an Application Program Interface provided in a data lake files client library on the first virtual private cloud.

10. The method of claim 9, wherein the data lake file application determines that the user should be granted access rights to the file based on trusted authorities listed in a cluster file container on the second virtual private cloud.

11. The method of claim 8, wherein the request to access the file contains a specialized header where the user requests direct access.

12. The method of claim 8, wherein the response comprises hyperscaler-specific data.

13. The method of claim 12, wherein the hyperscaler-specific data comprises a pre-signed uniform resource locator (URL).

14. The method of claim 12, wherein the hyperscaler-specific data comprises temporary credentials.

15. A non-transitory machine-readable medium storing instructions which, when executed by one or more processors, cause the one or more processors to perform operations comprising:
   receiving, at a first virtual private cloud, from a user, a request to access a file stored in a data lake object storage of a hyperscaler;
   generating a request, to authenticate the user, to a data lake file application on a second virtual private cloud, separate and distinct from the first virtual private cloud, the data lake object storage being separate and distinct from both the first virtual private cloud and the second virtual private cloud;
   receiving a response from the data lake file application on the second virtual private cloud, the response indicating that access rights to the file have been granted to the user; and
   in response to the receiving the response, directly accessing the data lake storage object from the first virtual private cloud to access the file.

16. The non-transitory machine-readable medium of claim 15, wherein the directly accessing the data lake storage object uses an Application Program Interface provided in a data lake files client library on the first virtual private cloud.

17. The non-transitory machine-readable medium of claim 16, wherein the data lake file application determines that the user should be granted access rights to the file based on trusted authorities listed in a cluster file container on the second virtual private cloud.

18. The non-transitory machine-readable medium of claim 17, wherein the request to access the file contains a specialized header where the user requests direct access.

19. The non-transitory machine-readable medium of claim 15, wherein the response comprises hyperscaler-specific data.

20. The non-transitory machine-readable medium of claim 19, wherein the hyperscaler-specific data comprises a pre-signed uniform resource locator (URL).

* * * * *